United States Patent [19]

Müller et al.

[11] Patent Number: 5,263,365
[45] Date of Patent: Nov. 23, 1993

[54] SYSTEM FOR DETECTING MISFIRES IN AN INTERNAL COMBUSTION ENGINE

[75] Inventors: Werner Müller, Untergruppenbach; Wolfgang Wimmer, Erlenbach; Anton Kantschar, Eberdingen-Hochdorf; Martin Klenk, Backnang, all of Fed. Rep. of Germany

[73] Assignees: Robert Bosch GmbH, Stuttgart; Audi AG, Ingolstadt, both of Fed. Rep. of Germany

[21] Appl. No.: 894,638

[22] Filed: Jun. 5, 1992

[30] Foreign Application Priority Data

Jun. 6, 1991 [DE] Fed. Rep. of Germany ....... 4118580

[51] Int. Cl.$^5$ .................... G01M 15/00; F02D 41/14; F02P 17/00
[52] U.S. Cl. ................... 73/117.3; 364/431.08; 123/419
[58] Field of Search .................. 73/117.3, 116, 35 M; 364/431.08; 123/419

[56] References Cited

U.S. PATENT DOCUMENTS

| | | | |
|---|---|---|---|
| 4,044,234 | 8/1977 | Frobenius et al. | 364/431.08 |
| 4,295,363 | 10/1981 | Buck et al. | 73/117.3 |
| 4,337,647 | 7/1982 | Radcliffe et al. | 73/116 |
| 4,380,800 | 4/1983 | Wilkinson | 364/431.08 |
| 5,041,980 | 8/1991 | Maddock et al. | 73/116 |
| 5,063,510 | 11/1991 | Jüngens et al. | 364/431.08 |
| 5,088,318 | 2/1992 | Osawa | 73/117.3 |

Primary Examiner—Hezron E. Williams
Assistant Examiner—George M. Dombroske
Attorney, Agent, or Firm—Walter Ottesen

[57] ABSTRACT

A system for detecting multiple misfires and for allocating misfires to cylinders for detected multiple misfires in a multi-cylinder internal combustion engine is so configured that the rough-running values for the individual cylinders are determined. The system then however forms sum terms with these rough-running values and, in turn, forms sums with these sum terms which sums are compared with threshold values. When at least one sum exceeds the corresponding threshold value, then this shows the presence of multiple misfires. As soon as multiple misfires are detected, the rough-running threshold values for allocating misfires to cylinders are reduced. Advantageously, the rough-running values are so modified in advance that their correction terms are influenced as little as possible by misfires. In this way, misfires can also reliably be allocated to individual cylinders when multiple misfires are present.

13 Claims, 4 Drawing Sheets

Fig. 1e $$LU(i) = [T(i)-T(i-1)] - [T(i-1)-T(i-2)] \quad (1)$$

$$LU(i) = [T(i)-T(i-1)] - [T(i-3)-T(i-4)] \quad (2)$$

$$LU(i) = [T(i)-T(i-1)] - [T(i-1)-\{T(i-1)+T(i-3)\}/2] \quad (3)$$

$$LU(i) = [T(i)-T(i-1)] - [T(i-1)-T(i-ZZ)]/ZZ \quad (4)$$

$$LU(i) = [T(i)-T(i-1)] - [T(i-1)-T(i-\{ZZ-1\})]/(ZZ-1) \quad (5)$$

$$ST(i) = LU(i) \quad (6)$$

$$ST(i) = LU(i) - LU(i-1) \quad (7)$$

$$ST(i) = LU(i) - [LU(i+1)+LU(i-1)]/2 \quad (8)$$

$$S = \sum_{i=1}^{ZZ} |ST(i)| \quad (9)$$

$$S = c * S\_VOR + (1-c) * |ST(i)| \quad (10)$$

$$S = |LU(i-ZZ)| + |ST(i-ZZ+1)| + \cdots + |ST(i-1)| + |LU(i)| \quad (11)$$

$$S1 = \sum_{i=1}^{ZZ-1} LU(i) \quad \text{for } i \text{ uneven} \quad (12)$$

$$S2 = \sum_{i=2}^{ZZ} LU(i) \quad \text{for } i \text{ even} \quad (13)$$

$$S = S1 - S2 \quad (14)$$

Fig. 4

SYSTEM FOR DETECTING MISFIRES IN AN INTERNAL COMBUSTION ENGINE

FIELD OF THE INVENTION

The invention relates to a system for detecting combustion misfires in a multi-cylinder internal combustion engine. In the following, the term "multiple misfires" means that several cylinders are affected by misfires. In practice, in each or almost every combustion stroke, the combustion misfires in these cylinders.

BACKGROUND OF THE INVENTION

Numerous methods are known for detecting combustion misfires in cylinders. Of these methods, only those are of interest in the following which operate with so-called rough-running variables. These variables describe essentially speed fluctuations of the engine. The greater that the engine speed fluctuates because of misfires, the greater, as a rule, is the value of the rough-running variable. If the rough-running value exceeds a threshold value, then this is an indication that a misfire is present in the affected cylinder. The threshold value is typically read out of a characteristic field in dependence upon current values of operating variables.

An overview of various systems (methods and arrangements) for detecting combustion misfires is provided in U.S. patent application Ser. No. 818,884, filed Jan. 10, 1992, now abandon which is incorporated herein by reference. It is here noted that the rough-running values typically include a base term and a correction term. The base term is, for example, the difference between the time spans in which specific angular ranges are passed over during the current combustion stroke and during the immediately previous combustion stroke, respectively. This difference is zero if the engine rotates uniformly. Deviations from zero occur with misfires but also during accelerations or decelerations. The correction term serves to compensate for those kinds of disturbance effects such as accelerations or decelerations. The correction term is, for example, the difference of the time spans in which during the last and the next-to-last combustion stroke, the above-mentioned angular ranges were passed over. If a constant acceleration or deceleration is present without misfires, then the above-mentioned differences, which form the base term or correction term, are equal and it is for this reason that the rough-running value is zero if the rough-running variable is formed in that the correction term is subtracted from the base term. In order to be able to also compensate for more complicated disturbance cases as precisely as possible in addition to constant accelerations or decelerations, correction terms are often computed in a more complicated manner with especially mean formation being of significant advantage. The correction terms can have multiple components in order to consider several disturbances.

Notwithstanding the complexity to which the computation of values of rough-running variables is taken, erroneous detections are always present in practice, that is, either a trouble-free operating cylinder is assigned a misfire or a defectively combusting cylinder is not detected as such. These erroneous detections occur especially when there are multiple misfires.

SUMMARY OF THE INVENTION

In view of the foregoing, there is a need for a system for detecting misfiring cylinders with the least possible difficulty in a multi-cylinder internal combustion engine.

Based on the observations described in greater detail below and the considerations based thereon, it has been shown that the above-mentioned erroneous detections in the case of multiple misfires are caused especially by the fact that the threshold value, with which the particular current rough-running value is compared, must be modified for multiple misfires. The threshold value is read out from an addressable characteristic field which is addressable via values of operating variables. If this threshold value is applied to an engine having an individual misfiring cylinder, this threshold value must be lowered if, in the case of multiple misfires, it is to be reliably detected which ones of the individual cylinders are affected by the misfires.

In view of the above, it is an object of the invention to provide a system for attributing the misfires to cylinders when multiple misfires are detected in a multi-cylinder internal combustion engine.

The system of the invention is for attributing misfires to cylinders when multiple misfires are detected in a multi-cylinder combustion engine. The system includes: means for determining rough-running values for individual misfires of cylinders; means for determining a particular current rough-running threshold value in dependence upon current values of operating variables, the threshold values being applicable to misfires in an individual cylinder; means for reducing the rough-running threshold value when multiple misfires are detected; and, means for concluding that a misfire is present in one cylinder when the rough-running value for this cylinder exceeds the reduced rough-running threshold value.

Experiments have shown that in practice it is adequate to reduce the rough-running threshold value independently of the number of multiple misfires by the same factor such as by 20%.

In describing the state of the art, it was noted that the rough-running variables typically are formed from a base term and a correction term. For example, the correction term is the difference of time spans in the last and next-to-last combustion strokes. If the individual cylinder detection provides that the next-to-last cylinder in the ignition sequence has misfires, it is evident that the correction term is incorrectly calculated. For the case of a rough-running variable with base and correction terms, the system according to the invention is therefore advantageously configured to include: a rough-running variable having a base term and a correction term and the system further includes: means for modifying the correction term for at least that cylinder for which misfires have been detected so as to cause the cylinder to be influenced as little as possible by the misfires; means for determining the final rough-running values of the cylinder with the aid of the particular modified correction term; and, means for concluding that misfires are present in a cylinder when the final rough-running value exceeds the reduced rough-running threshold value.

For modifying the correction term, numerous variations are possible of which several are described below in greater detail. The optimal embodiment is dependent especially upon the nature of the computation of the correction term.

It is a precondition for the system according to the invention that the fact that multiple misfires are present has already been detected.

The system of the invention is for detecting multiple misfires in a multi-cylinder engine and includes: means for determining rough-running values for individual cylinders; means for totaling a pregiven number of sum terms all of like sign with the sum terms being the rough-running values or a difference of these values; and, means for concluding that multiple misfires are present when one of the sum terms exceeds a pregiven sum threshold value.

The basis of these measures is now explained for the case of a so-called bank misfire. In a bank misfire, all cylinders of a cylinder bank show misfires, for example, all three cylinders of one side of a V-type six-cylinder engine. Combustions and misfires then alternate from one cylinder to the other. This means that the rough-running values alternate each time with the same amount positive and negative. The summation with the same sign can take place either in that the amounts of the rough-running values are added or in that all positive values are added and all negative values are added and then either each sum is compared to a threshold value or the difference of these sums is formed and this difference is compared to a threshold value.

In an advantageous feature of the sum formation, the system of the invention is directly in the position to not only detect multiple misfires but, at the same time, to detect which cylinders are affected by the misfires. This is again explained in the example of the above-mentioned bank misfire. If it is pregiven that two groups of cylinders are formed which correspond precisely to the banks and then in each group the sum values are added, then, in the case of a bank misfire, an especially high difference results between the sums of the two groups. If an especially high threshold value is exceeded, this accordingly not only shows that multiple misfires are present but it is also clear at the same time that it must be a bank misfire and it is evident which bank is the misfiring bank from the signs of the difference of the sum values.

If for other engine constructions, other types of collective misfires are probable in lieu of bank misfires, it is advantageous to correspondingly form two groups from which one group contains those cylinders which are affected by the collective misfire case and the other group contains the remaining cylinders. Otherwise, the procedure is followed as in the case of bank misfires.

BRIEF DESCRIPTION OF THE DRAWINGS

The invention will now be described with reference to the drawings wherein:

FIG. 1a shows the case of constant engine speed without misfires;

FIG. 1b shows a linear increase in engine speed without misfires; FIG. 1c shows a constant engine speed with a single misfire; FIG. 1d shows a constant engine speed with two sequential misfires; and, FIG. 1e shows a constant engine speed with one bank misfire;

DESCRIPTION OF THE PREFERRED EMBODIMENTS OF THE INVENTION

Before describing the system according to the invention for detecting multiple misfires and for allocating misfires to the cylinders, it is believed helpful to first explain the uncertainties associated with the determination of threshold values for detecting misfires.

In all of the FIGS. 1a to 1e, the x-direction is the time axis (t). The time span appears on the horizontal axis within which a pregiven angular range is passed over by the crankshaft; for example, the angular range of $-30°$ before the start of a combustion stroke extending up to $30°$ after the start of the stroke for a particular cylinder I to VI. The time span measured for each cylinder is characterized by a cross. For constant engine speed without misfires (FIG. 1a), all time spans have the value T0. The value of T0 is shown by broken lines in the other FIGS. 1a to 1e.

Figure 1A:
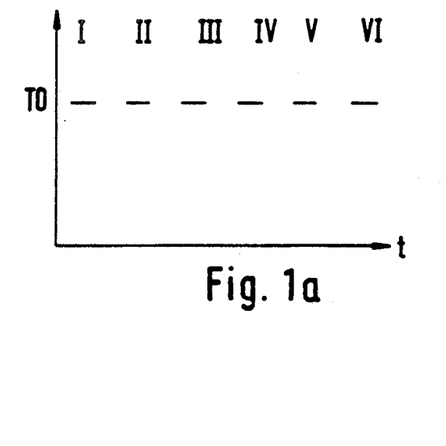
FIGS. 1a to 1e are diagrams concerning time spans in each of six sequential combustion strokes (I to VI).

The rough-running value for the cylinder IV is, for example, provided by $(T\_IV-T\_III)-(T\_III-T\_II)$. The first term in parentheses is the base term of the rough-running variable and the second term in parentheses is the correction term. Both terms are zero for constant engine speed without misfires.

Figure 1B:
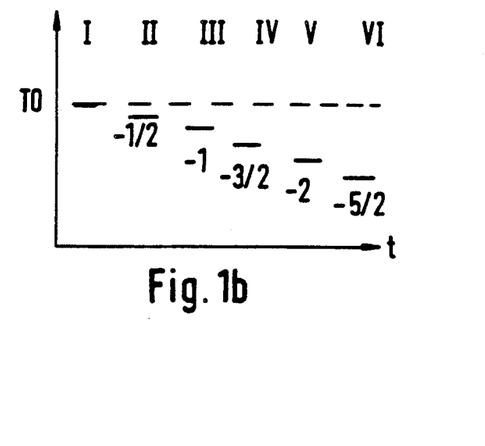

When the engine speed is increased linearly as shown in FIG. 1b, the specified time spans shorten from one cylinder to the next. In FIG. 1b, it is assumed that the change from one time span to the next time span is in each case a shortening by a desired unit. In this case, the base term defined as above has the value $-\frac{1}{2}$ which also applies to the correction term so that the rough-running value is again zero.

Figure 1C:
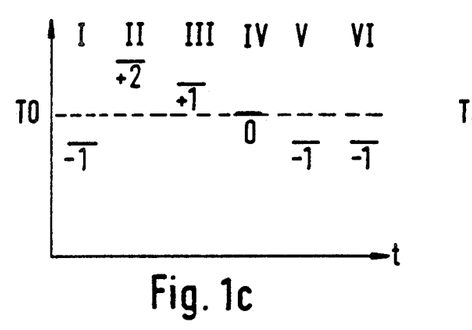

FIG. 1c concerns the case of a single misfiring cylinder which is here identified as cylinder II. For this cylinder, the specified time span is increased. An increase by two arbitrarily selected units is assumed. Since the engine speed is intended to remain constant, a shortening of the specified time span must occur in at least one portion of the other cylinders. According to FIG. 1c, such shortenings are present for the cylinders I, V and VI.

Figure 1D:
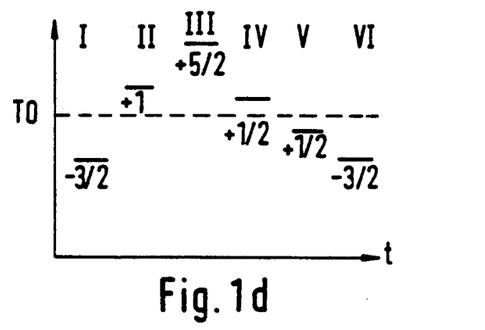

For the case of FIG. 1d, misfires occur in two sequential cylinders which are here cylinders II and III. For these cylinders, extended time spans again occur as well as for cylinder IV; whereas, the time spans are shortened for the other cylinders.

Figure 1E:
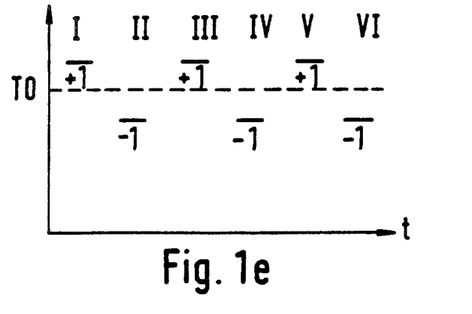

FIG. 1e is concerned with a bank misfire, that is, a case of multiple misfires wherein all cylinders of a bank have misfires, here, the cylinders I, III and V. For these cylinders, the specified time spans are increased whereas the time spans are shortened for the other cylinders.

It is now assumed that a vehicle with the misfires in one cylinder according to FIG. 1 drives up a slightly inclining hill with pregiven values of engine speed and load. When two cylinders misfire, and according to FIG. 1d, the same vehicle can only drive along a level road with the same engine speed and load. When finally an entire bank misfires, that is, three cylinders according to FIG. 1c, then the motor vehicle can maintain the mentioned engine speed at the mentioned load only when driving on a slightly declining stretch. It is now however evident that, when a motor vehicle travels uphill and suddenly a combustion fails, the engine is more decelerated than when the vehicle travels slightly downhill and a combustion fails. Stated otherwise, the greater the torque which the engine has to develop, the greater is the reduction in engine speed when a combustion fails. The rough-running value then becomes less with a reducing torque. If now threshold values for comparison with rough-running values for the case of an individual cylinder with misfires are recorded on a test stand for different engine speeds and loads and written into a characteristic field, then the problem occurs that these threshold values are too high for multiple misfires because, as explained above, for multiple misfires for each pregiven engine speed and load, the torque is less than in the case of misfires in a single cylinder.

The consideration explained above is utilized by the system to be described next in such a way that the threshold values read out of the characteristic field are reduced for the comparison to the rough-running values when it is detected that multiple misfires are present. Alternatively, in the case of multiple misfires, the threshold values read out of the characteristic field could be held constant and instead the rough-running values be increased which were first computed.

The system described below however utilizes a still further consideration which is likewise evident from FIGS. 1c to 1e. The magnitude of the jump from one time span to the next time span becomes less with an increasing number of misfires, but the sum of the amounts of the jumps becomes ever greater. Accordingly, in the example of FIG. 1c for the individual cylinder with misfires, a maximum jump from $-1$ to $+2$ is shown and vice versa and for the case of FIG. 1d with two sequential cylinders with misfires, a maximum jump of $-1\frac{1}{2}$ to $+1$ is shown and vice versa and finally, for the case of a bank misfire according to FIG. 1e, a maximum jump of $+1$ to $-1$ is shown and vice versa. The sum of all differences however changes in the opposite direction. More specifically, the sum for and for FIG. 1c is minimal with the value 6 and for FIG. 1e, the sum is maximal with the value 10; whereas, for the case of FIG. 1d, the value 8 lies at the center. Multiple misfires can therefore be detected by means of especially high sum values. In order to here hold the influence of accelerations or decelerations to a minimum, it is advantageous not to use the differences between two sequential time spans as a sum term; instead, it is advantageous to form the sum term in a more complicated manner as will be explained in greater detail below.

Figure 2:
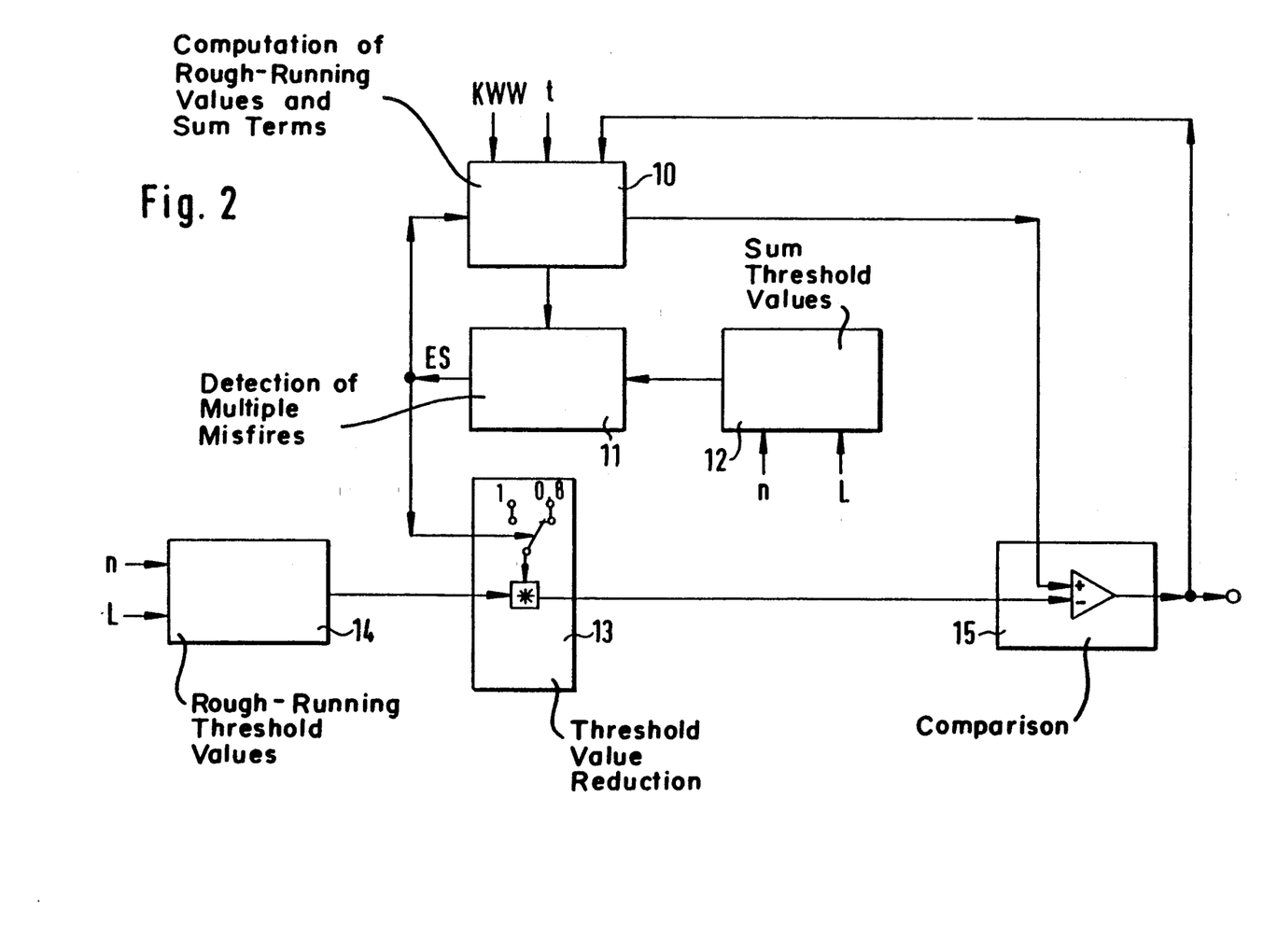
FIG. 2 shows a block diagram of an embodiment of the system according to the invention.

In the block diagram of FIG. 2 of a system according to the invention, a computation block 10 is provided for computing the rough-running values mentioned above and the sums. This computation block receives signals KWW at each current crankshaft angle and time clock signals (t). The computation block 10 supplies the computed sums to a multi-misfire detection block 11 to which sum threshold values are supplied from a sum threshold value block 12. This sum threshold value block 12 is preferably realized as a characteristic field which can be addressed via the particular current values of engine speed (n) and the load L. The computed sums are compared to the particular current sum threshold value in the multi-misfire detection block 11. A detection signal is emitted when a multi-misfire case is detected as a consequence of the comparison. This detection signal carries out various functions and one function is that this signal switches over from a multiplier factor 1 to a multiplier factor 0.8 in a threshold-value reduction block 13. With this factor, a rough-running threshold value is multiplied as it is read out of a rough-running threshold value block 14. This rough-running threshold value block 14 is preferably configured as a characteristic field which can be addressed via the current values of engine speed (n) and the load L. The multiplication result from the current rough-running threshold value and the above-mentioned factor is supplied to a comparator block 15 wherein the rough-running values from the computation block 10 are compared to the rough-running threshold value modified by the factor. The comparator block 15 emits a signal for one cylinder after the other which indicates whether the particular cylinder has a misfire or not. These comparisons take place twice in the case of multiple misfires. It is first determined on the basis of the original rough-running values which cylinders have the misfires. After this is determined, the correction terms in the rough-running values are so modified that the correction terms are as independent as possible from the measured values from the cylinders which are presumed to have misfires. With the rough-running values modified in this manner, the above-mentioned comparisons are again carried out.

If the signal from the multi-misfire detection block 11 shows that no multiple misfires are present, then a switchover to the factor 1 takes place in the threshold-value reduction block 13 and, in comparison block 15, the above-mentioned comparisons are carried out only once on the basis of the original rough-running values.

The operation sequence of the system according to the invention just described above is shown in detail in the flowchart of FIG. 3. The blocks of the flowchart are provided with detailed legends so that a further description thereof is not needed here. However, with respect to FIG. 4, the following is explained: examples for the computation of rough-running values and sum terms in step s3.1; totalling the sum terms according to step s3.2; and, directly thereafter, the modification of rough-running values according to step s3.15.

Figure 4:
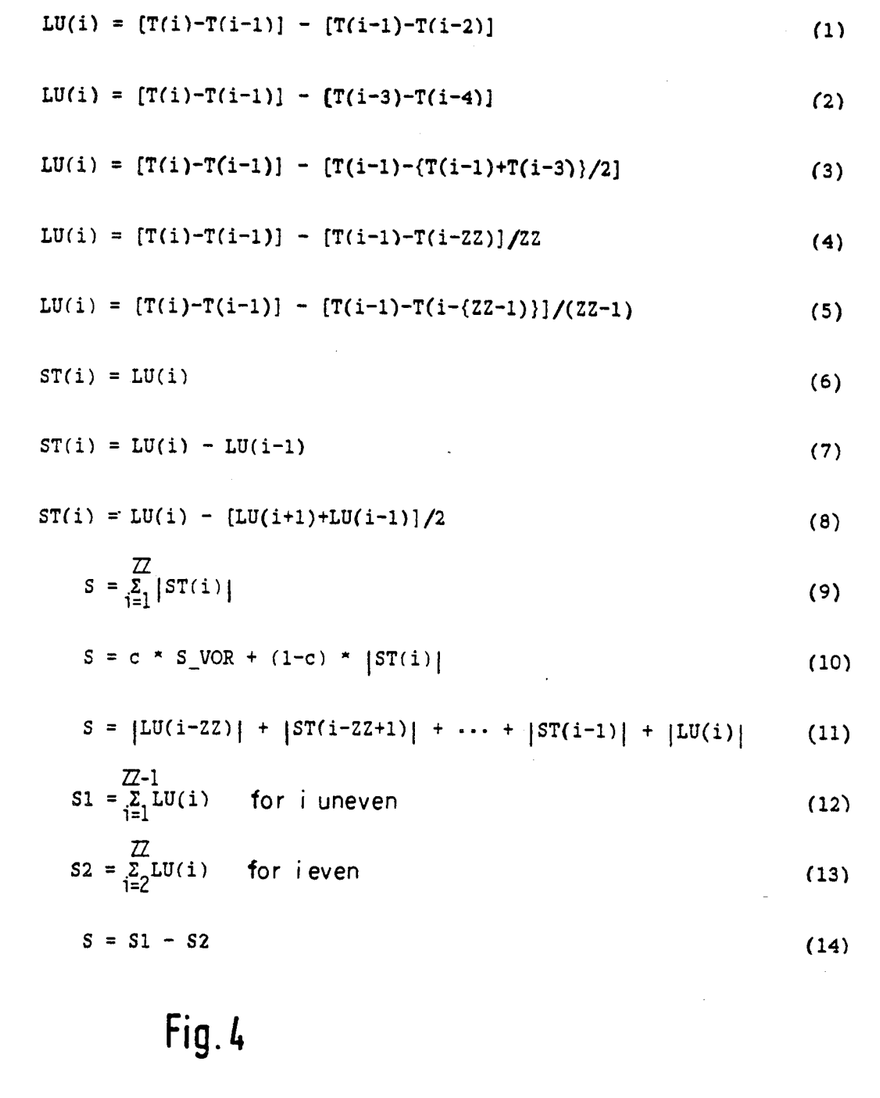
FIG. 4 is a table showing equations for rough-running values, sum terms and sums.

Equation (1) of FIG. 4 concerns the computation of a rough-running value LU(i) for a cylinder (i) having a base term and a correction term as explained with reference to FIG. 1. The base term utilizes time spans for the cylinders (i) and (i−1); whereas, the correction term utilizes time spans for the cylinders (i−1) and (i−2). The equations (2) and (3) explain cases such as how the rough-running variable LU(i) is modified in the case of a misfire in cylinder (i−2) in order to make the correction term independent of the time span T(i−2). According to equation (2), the base term is formed from entirely different time spans, namely those time spans for the cylinders (i−3) and (i−4). In contrast, and according to equation (3), the time span T(i−2) is simulated, namely, as a mean value of the time spans for the last previous and the next cylinder, that is, the cylinders (i−1) and (i−3).

A further variation for modifying the correction term is explained with respect to equations (4) and (5). According to equation (4), the assumption is made that the correction term is formed as a mean value over the time spans of all cylinders ZZ. It is now assumed that it has already been determined that the last cylinder in the number sequence has misfires associated therewith. The time span of this cylinder is then no longer considered according to equation (5) and only the time spans of ZZ-1 cylinders are averaged.

After the variations of step s3.15 have been discussed, the variations of step s3.1 will now be explained. These variations concern the computation of the rough-running value LU(i). Examples thereof are the equations (1) and (4). An overview of further examples is provided in the above-mentioned patent application Ser. No. 818,884, filed Jan. 10, 1992, and incorporated herein by reference.

Further variations of step s3.1 are those concerning sum term computation. The equations (6) to (8) will be helpful for the purpose of explanation. According to equation (6), the rough-running value LU(i) is used as the sum term ST(i) for a cylinder. According to equation (7), the difference between the two sequential rough-running values is used and according to equation (8), the difference between the rough-running value for a current cylinder and the mean value of the rough-running values for the last previous and next cylinder is computed. The more effort applied in this regard, the more reliable will be, as a rule, the subsequent evaluation. For special cases, it is also possible to obtain very reliable misfire detection with the aid of the rough-running values LU(i) as sum terms. This is explained further below with respect to the example of equations (13) to (15).

The simplest summation as it is carried out in step s3.2 is that of equation (9) according to which the sum of the amounts is formed over the sum terms ST(i) for all cylinders. This sum can be formed once each 720° of crankshaft rotation or this sum can be realized with each combustion stroke.

If an actualization takes place with each combustion stroke, then the averaged mean value computation according to equation (10) is more advantageous. Here, each computed sum S is weighted for the next computation of the sum as sum S_VOR from the previous computation by a weighting factor (c) which is preferably between 0.95 and 0.99 and the new sum term is considered with the factor $1-c$.

If it is to be ensured that only values from an angle range of 720° of the crank angle are used in the computation, then the formation of the sum according to equation (11) is advantageous. In this equation, the sum terms ST are difference terms, that is, terms according to one of the equations (7) or (8).

The equations (12) to (14) are concerned with the case of a simple bank misfire. Two groups of sums are formed. A first sum S1 is formed for the uneven numbered cylinders and the sum S2 for the even numbered cylinders. The rough-running values are used directly in each sum. These rough-running values have for a bank misfire in each group the same sign and are therefore in the one group all positive and in the other group all negative. Since totalling does not take place by amount, it is ensured that especially high group sums are only then obtained when a bank misfire actually is present. Such a bank misfire can reliably be determined when at least one of the group sums lies above a sum threshold value. The result is still more reliable when, according to equation (14), the difference between the two group sums is formed and the sum value obtained in this manner is compared to a sum threshold value.

Figure 3:
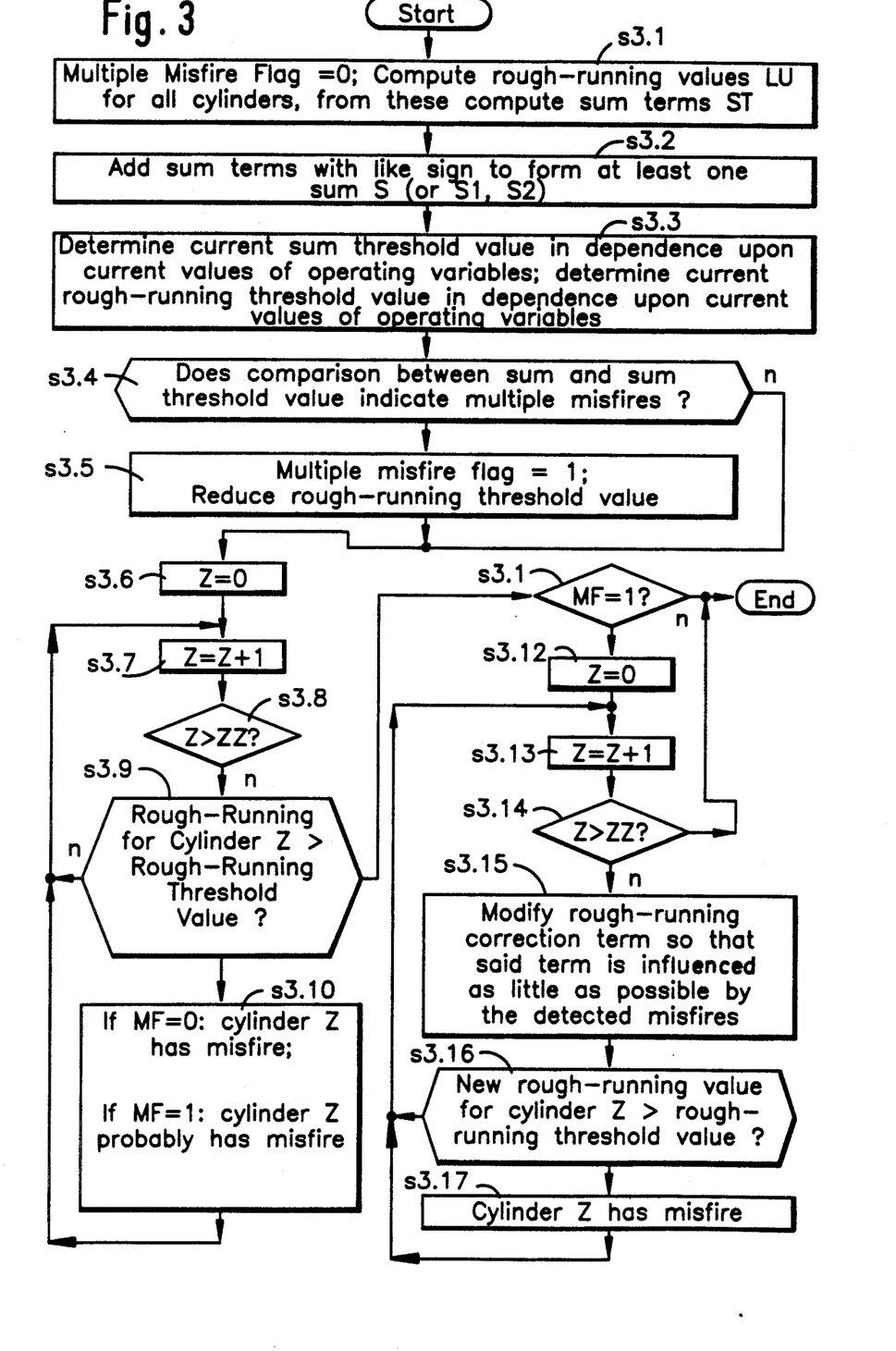
FIG. 3 is a flowchart showing the operation of the system of FIG. 2.

The embodiment of the system of the invention as shown in FIGS. 2 and 3 utilizes three individual principles which can be applied individually or in double combinations. The first principle is the principle of multiple misfire detection by means of sum formation. The second principle is that principle wherein the threshold value is reduced for rough-running values in the case of multiple misfires. The third principle is that principle of modifying rough-running values in the case of multiple misfires in such a manner that the correction term is as independent as possible when computing a particular rough-running value of misfires.

In the embodiment according to the second principle, the presumption is made that rough-running threshold values for misfires are only predetermined in one individual cylinder. In this case, the particular rough-running threshold value is reduced in the case of multiple misfires. However, if rough-running threshold values for multiple misfires are pregiven, then this threshold value would be increased in the case of the absence of multiple misfires.

In the flowchart of FIG. 3, a general misfire detection method having a sum according to one of the equations (9) to (11) is carried out. However, when the group misfire in an engine is the most probable type of multiple misfire, it is advantageous to first carry out the group misfire detection, for example, the block misfire detection according to the equations (12) to (14). If the group misfire which is checked is actually present, then at the same time, the affected cylinders are known with the determination of this type of misfire. It is then unnecessary to carry out a complicated multiple misfire detection method with subsequent cylinder determination.

It is understood that the foregoing description is that of the preferred embodiments of the invention and that various changes and modifications may be made thereto without departing from the spirit and scope of the invention as defined in the appended claims.

What is claimed is:

1. A system of attributing misfires to cylinders when multiple misfires are detected in a multi-cylinder combustion engine, the system comprising:
   means for determining rough-running values for individual misfires of cylinders;
   means for determining a particular current rough-running threshold value in dependence upon current values of operating variables, said threshold value being applicable to only a single misfire in an individual cylinder per engine period;
   means for reducing said rough-running threshold value when multiple misfires are detected; and,
   means for concluding that a misfire is present in one cylinder when the rough-running threshold value for this cylinder exceeds the reduced rough-running threshold value.

2. The system of claim 1, wherein said system is so configured that said system reduces said rough-running threshold value by a factor when a cylinder misfires and that said factor is the same independently of the number of the misfiring cylinders.

3. The system of claim 1, wherein each of said rough-running values has a base term and a correction term and wherein the system further comprises;
   means for modifying the correction term for at least said cylinder for which a misfire has been detected so as to cause said cylinder to be influenced as little as possible by the misfiring
   means for determining a final rough-running value of said cylinder with the aid of the particular modified correction term; and,
   means for concluding that misfires are present in said cylinder when the final rough-running value exceeds the reduced rough-running threshold value.

4. The system of claim 3, further comprising means for computing said correction term so as to cause said correction term not to contain a measured value from a cylinder wherein misfires occur.

5. The system of claim 1, said means for reducing said rough-running threshold value comprising:

means for determining rough-running values for individual cylinders;

means for totaling a pregiven number of sum terms all of like sign with the sum terms being said rough-running values or a difference of said values; and, means for concluding that multiple misfires are present when one of said sum terms exceeds a pregiven sum threshold value.

6. The system of claim 5, wherein said sum terms are totaled in amount.

7. The system of claim 5, further comprising means for determining a current threshold value in dependence upon current values of operating variables.

8. A system of attributing misfires to cylinders when multiple misfires are detected in a multi-cylinder combustion engine, the system comprising:

means for determining rough-running values for individual misfires of cylinders;

means for determining a particular current rough-running threshold value in dependence upon current values of operating variables, said threshold value being applicable to only a single misfire in an individual cylinder per engine period;

means for reducing said rough-running threshold value when multiple misfires are detected;

means for concluding that a misfire is present in one cylinder when the rough-running value for this cylinder exceeds the reduced rough-running threshold value;

each of said rough-running values having a base term and a correction term;

means for modifying the correction term for at least said cylinder for which a misfire has been detected so as to cause said cylinder to be influenced as little as possible by the misfires;

means for determining a final rough-running value of said cylinder with the aid of the particular modified correction term;

means for concluding that misfires are present in said cylinder when the final rough-running value exceeds the reduced rough-running threshold value;

said correction term having measured values attributed to one cylinder wherein misfires occur and where cylinders adjacent said one cylinder are unaffected by misfires; and, means for substituting said measured values with a particular mean value of the corresponding measured values of said adjacent cylinders.

9. A system of attributing misfires to cylinders when multiple misfires are detected in a multi-cylinder combustion engine, the system comprising:

means for determining rough-running values for individual misfires of cylinders;

means for determining a particular current rough-running threshold value in dependence upon current values of operating variables, said threshold value being applicable to only a single misfire in an individual cylinder per engine period;

means for reducing said rough-running threshold value when multiple misfires are detected;

means for concluding that a misfire is present in one cylinder when the rough-running value for this cylinder exceeds the reduced rough-running threshold value;

means for reducing said rough-running threshold value comprising: means for determining rough-running values for individual cylinders; means for totaling a given number of sum terms all of like sign with the sum terms being said rough-running values or a difference of said values; and, means for concluding that multiple misfires are present when one of said sum terms exceeds a pregiven sum threshold value; and, a particular one of said rough-running values being used directly as a sum term.

10. A system of attributing misfires to cylinders when multiple misfires are detected in a multi-cylinder combustion engine, the system comprising:

means for determining rough-running values for individual misfires of cylinders;

means for determining a particular current rough-running threshold value in dependence upon current values of operating variables, said threshold value being applicable to only a single misfire in an individual cylinder per engine period;

means for reducing said rough-running threshold value when multiple misfires are detected;

means for concluding that a misfire is present in one cylinder when the rough-running value for this cylinder exceeds the reduced rough-running threshold value;

said means for reducing said rough-running values value comprising: means for determining rough-running values for individual cylinders; means for totaling a given number of sum terms all of like sign with the sum terms being said rough-running values or a difference of said values; and, means for concluding that multiple misfires are present when one of said sum terms exceeds a pregiven sum threshold value; and, the difference of the rough-running values for adjacent cylinders being used as the sum term.

11. A system of attributing misfires to cylinders when multiple misfires are detected in a multi-cylinder combustion engine, the system comprising:

means for determining rough-running values for individual misfires of cylinders;

means for determining a particular current rough-running threshold value in dependence upon current values of operating variables, said threshold value being applicable to only a single misfire in an individual cylinder per engine period;

means for reducing said rough-running threshold value when multiple misfires are detected;

means for concluding that a misfire is present in one cylinder when the rough-running value for this cylinder exceeds the reduced rough-running threshold value;

said means for reducing said rough-running threshold value comprising: means for determining rough-running values for individual cylinders; means for totaling a given number of sum terms all of like sign with the sum terms being said rough-running values or a difference of said values; and means for concluding that multiple misfires are present when one of said sum terms exceeds a pregiven sum threshold value; and, the difference between the rough-running value of one cylinder and the mean value of the rough-running values for the next adjacent cylinders being used as the sum term for said one cylinder.

12. A system attributing misfires to cylinders when multiple misfires are detected in a multi-cylinder combustion engine, the system comprising:

- means for determining rough-running values for individual misfires of cylinders;
- means for determining a particular current rough-running threshold value in dependence upon current values of operating variables, said threshold value being applicable to only a single misfire in an individual cylinder per engine period;
- means for reducing said rough-running threshold value when multiple misfires are detected;
- means for concluding that a misfire is present in one cylinder when the rough-running value for this cylinder exceeds the reduced rough-running threshold value;
- said means for reducing said rough-running threshold value comprising: means for determining rough-running values for individual cylinders; means for totaling a given number of sum terms all of like sign with the sum terms being said rough-running values or a difference of said values; and means for concluding that multiple misfires are present when one of said sum terms exceeds a pregiven sum threshold value; and,
- means for apportioning the cylinders into two groups of cylinders for which it is known, that for a given type of multiple misfires, the cylinders of the first group supply negative sum terms while the cylinders of the second group supply positive sum terms; and,
- means for forming the sum in each group.

13. The system of claim 12, further comprising:
- means for forming the difference of said sums;
- means for concluding as to the presence of multiple misfires of said predetermined type when this sum difference exceeds a sum difference threshold value; and,
- attributing the multiple misfires of the cylinders to one of the two groups depending upon the sign of the sum difference.

* * * * *

UNITED STATES PATENT AND TRADEMARK OFFICE
CERTIFICATE OF CORRECTION

PATENT NO. : 5,263,365

DATED : November 23, 1993

INVENTOR(S) : Werner Müller, Wolfgang Wimmer, Anton Kantschar and Martin Klenk It is certified that error appears in the above-identified patent and that said Letters Patent is hereby corrected as shown below:

In column 1, line 29: delete "abandon" and substitute -- abandoned -- therefor.

In column 5, line 38: delete "and for".

In column 8, line 56: after "comprises", delete ";" and substitute -- : -- therefor.

In column 8, line 60: after "misfiring", insert -- ; --.

In column 10, line 1: before "means", insert -- said --.

In column 10, line 29: delete "values" and substitute -- threshold -- therefor.

Signed and Sealed this

Twenty-fourth Day of May, 1994

Attest:

BRUCE LEHMAN

*Attesting Officer*     *Commissioner of Patents and Trademarks*